(12) United States Patent
Kister et al.

(10) Patent No.: US 12,442,834 B2
(45) Date of Patent: Oct. 14, 2025

(54) VERTICAL PROBE ARRAY HAVING SLIDING CONTACTS IN ELASTIC GUIDE PLATE

(71) Applicant: FormFactor, Inc., Livermore, CA (US)

(72) Inventors: January Kister, Portola Valley, CA (US); Kevin John Hughes, Jurupa Valley, CA (US)

(73) Assignee: FormFactor, Inc., Livermore, CA (US)

( * ) Notice: Subject to any disclaimer, the term of this patent is extended or adjusted under 35 U.S.C. 154(b) by 102 days.

(21) Appl. No.: 18/107,231

(22) Filed: Feb. 8, 2023

(65) Prior Publication Data

US 2023/0251287 A1 Aug. 10, 2023

Related U.S. Application Data

(60) Provisional application No. 63/307,909, filed on Feb. 8, 2022.

(51) Int. Cl.
*G01R 31/20* (2006.01)
*G01R 1/073* (2006.01)

(52) U.S. Cl.
CPC ............... *G01R 1/07307* (2013.01)

(58) Field of Classification Search
CPC .............. G01R 1/07307; G01R 1/0735; G01R 1/0738; G01R 1/07314; G01R 1/07371; G01R 1/06733; G01R 1/06772; G01R 1/06744; G01R 1/06738; G01R 1/0483; G01R 1/0408; G01R 1/0466
See application file for complete search history.

(56) References Cited

U.S. PATENT DOCUMENTS

| | | | |
|---|---|---|---|
| 4,427,250 A | 1/1984 | Hines | |
| 5,385,477 A | 1/1995 | Vaynkof | |
| 5,863,636 A | 1/1999 | Druschke | |
| 7,980,165 B2 | 7/2011 | Misencik | |
| 9,570,828 B2 | 2/2017 | Chui | |
| 10,031,163 B2 | 7/2018 | Foong | |
| 11,156,637 B2 | 10/2021 | Kister | |
| 2004/0212383 A1* | 10/2004 | Yanagisawa | G01R 1/0441 324/754.08 |
| 2005/0212539 A1 | 9/2005 | Chen | |

(Continued)

FOREIGN PATENT DOCUMENTS

| | | |
|---|---|---|
| CN | 106546780 | 3/2017 |
| DE | 102014103262 | * 6/2015 |
| KR | 102169836 | 10/2020 |

*Primary Examiner* — Thang X Le
(74) *Attorney, Agent, or Firm* — LUMEN PATENT FIRM

(57) ABSTRACT

A probe array having decoupled electrical and mechanical design constraints on the probes is provided. Each probe is a two-part structure with the two parts able to stay in electrical contact with each other as the parts slide up and down with respect to each other. The probes are disposed in through holes of an elastic matrix, each probe having its corresponding hole. The probes engage with the elastic matrix such that a restoring force in response to vertical probe compression is provided by the elastic matrix. With this approach, electrical and mechanical design are much more decoupled than in conventional spring probe design. The elastic matrix provides the mechanical compliance and restoring force, while the parts of the probe determine its current carrying capacity and electrical bandwidth.

13 Claims, 14 Drawing Sheets

(56) References Cited

U.S. PATENT DOCUMENTS

| | | |
|---|---|---|
| 2006/0073710 A1 | 4/2006 | Hwang |
| 2011/0025356 A1 | 2/2011 | Nielsen |
| 2013/0154678 A1* | 6/2013 | Nelson .............. G01R 1/06744 324/750.24 |
| 2013/0342233 A1* | 12/2013 | Edwards ............ G01R 1/06733 29/874 |
| 2014/0197860 A1 | 7/2014 | Hsu |
| 2019/0041429 A1 | 2/2019 | Edwards |
| 2022/0056606 A1* | 2/2022 | Ahn .................... G01R 1/06733 |
| 2023/0408548 A1* | 12/2023 | Maggioni ............ H05K 3/4015 |
| 2024/0012025 A1* | 1/2024 | Crippa ............... G01R 1/06722 |

* cited by examiner

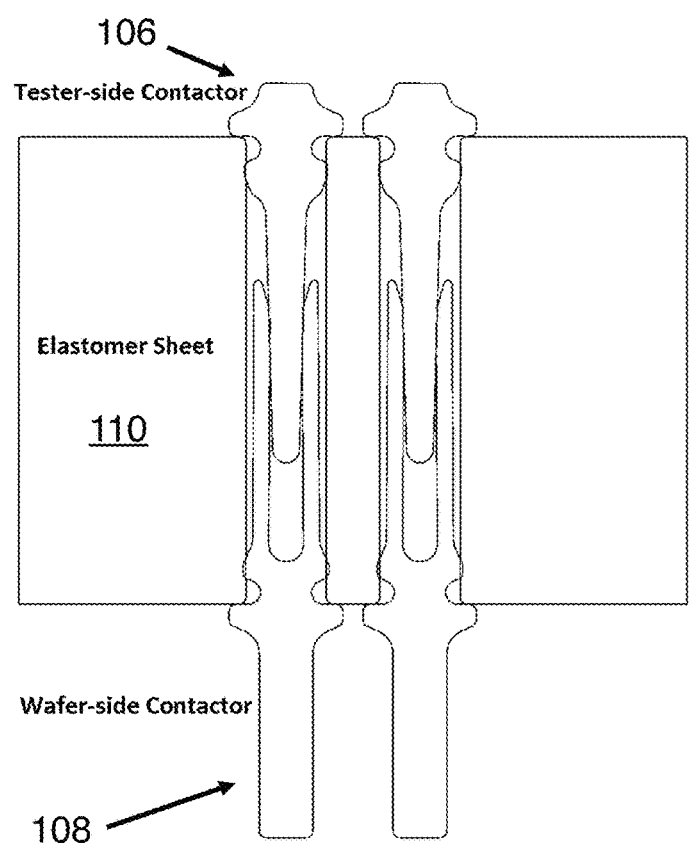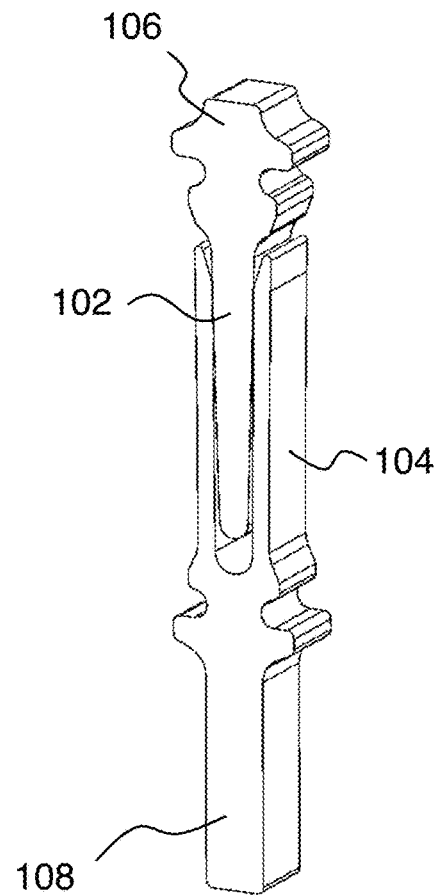
FIG. 7A
FIG. 7B

VERTICAL PROBE ARRAY HAVING SLIDING CONTACTS IN ELASTIC GUIDE PLATE

CROSS REFERENCE TO RELATED APPLICATIONS

This application claims priority from US Provisional Patent Application 63/307,909 filed Feb. 8, 2022, which is incorporated herein by reference.

FIELD OF THE INVENTION

This invention relates to probes for testing electrical devices and circuits.

BACKGROUND

Testing of electrical devices and circuits is often done by using probe arrays to make temporary electrical contact to the device under test. Such probe arrays typically include a large number of probes disposed on a test fixture, and testing is done by bringing the test fixture in proximity to the device under test such that temporary electrical contact is made. The probes are mechanically elastic to accommodate fabrication tolerance of probe length (and deviations from flatness of the device under test) and to provide a suitable contact force for the testing.

In such probe arrays, the probe-body does all the work: 1) it is the electrical path, so it needs to provide the required current carrying capacity at the required electrical frequency of the testing; 2) it provides the mechanical compliance; and 3) it provides the mechanical restoring force. These requirements are often in conflict with each other. For example, high current carrying capacity tends to favor thick probes, and operating at high electrical frequency tends to favor short probes, but short, thick spring probes will tend to have undesirably high contact force and undesirably low mechanical compliance.

SUMMARY

In this work, the electrical and mechanical design constraints on the probes are decoupled. Each probe is a two-part structure with the two parts able to stay in electrical contact with each other as the parts slide up and down with respect to each other. The probes are disposed in through holes of an elastic matrix (each probe having its corresponding hole). The probes engage with the elastic matrix such that a restoring force in response to vertical probe compression is provided by the elastic matrix.

With this approach, electrical and mechanical design are much more decoupled than in conventional spring probe design. The elastic matrix provides the mechanical compliance and restoring force, while the parts of the probe determine its current carrying capacity and electrical bandwidth.

BRIEF DESCRIPTION OF THE DRAWINGS

FIGS. 7A-E relate to a detailed exemplary design.

DETAILED DESCRIPTION

Figure 1:
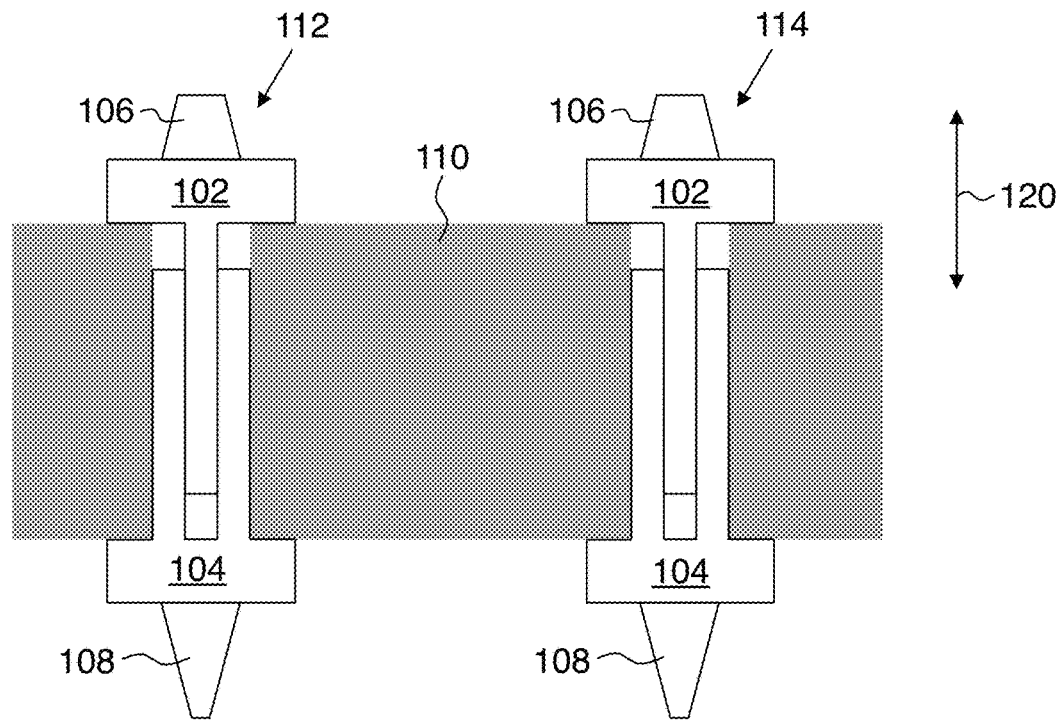
FIG. 1 shows an exemplary embodiment of the invention.

FIG. 1 shows an exemplary embodiment of the invention. This example is a probe array for making temporary electrical contact to a device under test, where the probe array includes two or more probes (112 and 114) and an elastic matrix 110 configured as a sheet having at least one elastomer layer and including an array of through holes. Each of the two or more probes is disposed in a corresponding one of the through holes, and a vertical direction 120 is perpendicular to the elastic matrix. Each probe includes a first part 102 and a second part 104 configured to make a sliding electrical contact with each other as the first part and the second part move with respect to each other along the vertical direction 120. Typically, the probes also include test-side contacts 106 and device-side contacts 108. Each probe engages with the elastic matrix 110 such that a restoring force in response to vertical probe compression is provided by the elastic matrix. Although only two probes are shown on FIG. 1 for simplicity, probe arrays in practice tend to include a large number of probes in a regular or irregular 2D array.

In some embodiments, MEMS (microelectrical-mechanical systems) technology can be used to fabricate the probes. Such probes can further include grounded metal shields where the sliding parts of the probe are to test a signal terminal of the device under test.

The probes may or may not be affixed to the elastic matrix. In cases where the probes aren't affixed to the elastic matrix, retention features on the probes can be used to provide mechanical engagement of the probes with the elastic matrix. In cases where the probes are affixed to the elastic matrix, an adhesive can be used for this purpose. Affixing the probes to the elastic matrix can provide advantages such as preventing the probes from falling out of the elastic matrix, and distributing the stresses from vertical probe compression more evenly throughout the elastic matrix.

As indicated above, this approach advantageously decouples electrical and mechanical design constraints on the probes. Each probe is a two-part structure with the two parts able to stay in electrical contact with each other as the parts slide up and down with respect to each other. The restoring force in response to vertical probe compression is provided by the elastic matrix. The elastic matrix provides the mechanical compliance and restoring force, while the parts of the probe determine its current carrying capacity and electrical bandwidth. For example, with this approach the probes can be made thick (for high current carrying capacity) and short (for good high frequency performance) while the elastic matrix provides suitable contact force and mechanical compliance.

In one exemplary high frequency design, the probe tip to tip length is 500 μm, and the thickness of the elastic matrix is 350 μm. Such a probe can provide an electrical bandwidth of at least 100 GHz, and this excellent bandwidth is mainly enabled by the short probe length. The mechanical compliance is 100 μm, enabled by the sliding contact between the two probe parts. A one-piece vertical probe having this combination of electrical bandwidth and mechanical compliance (along with acceptable current carrying capacity) is basically impossible. More generally, it is expected that probe lengths with this approach will typically be in a range from 250 μm to 750 μm. This is in sharp contrast to conventional vertical probe lengths of 2.7 mm to 6.5 mm.

Further advantages of this approach is that it is field-repairable and the concept scales up and down in lateral probe pitch with minimal modification.

Figure 2A:
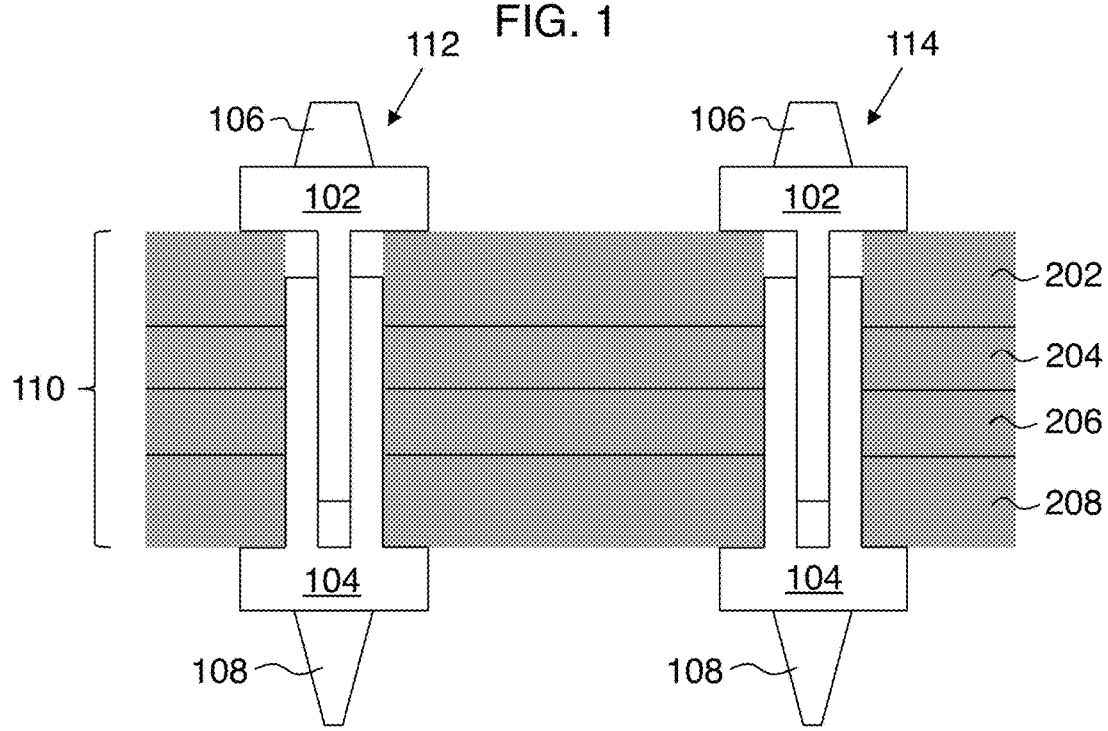
FIGS. 2A-C show exemplary multi-layer embodiments of the invention.
Figure 2B:
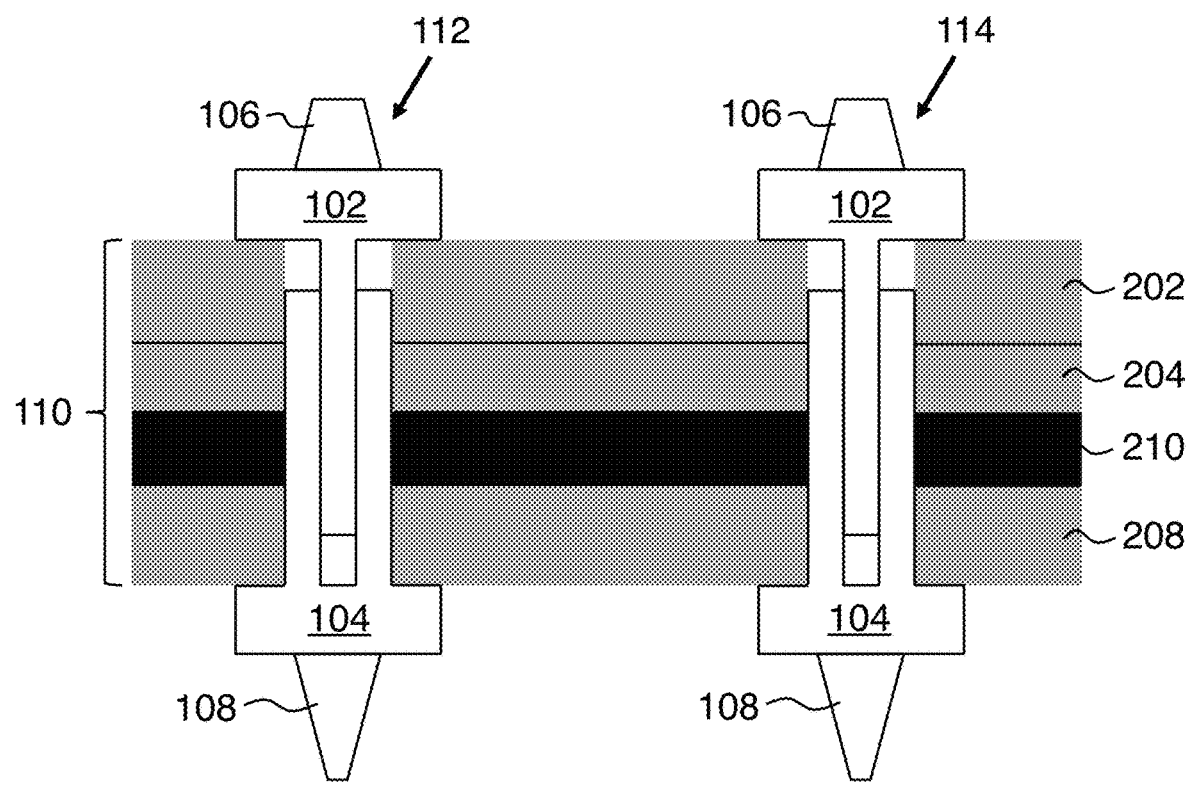
Figure 2C:
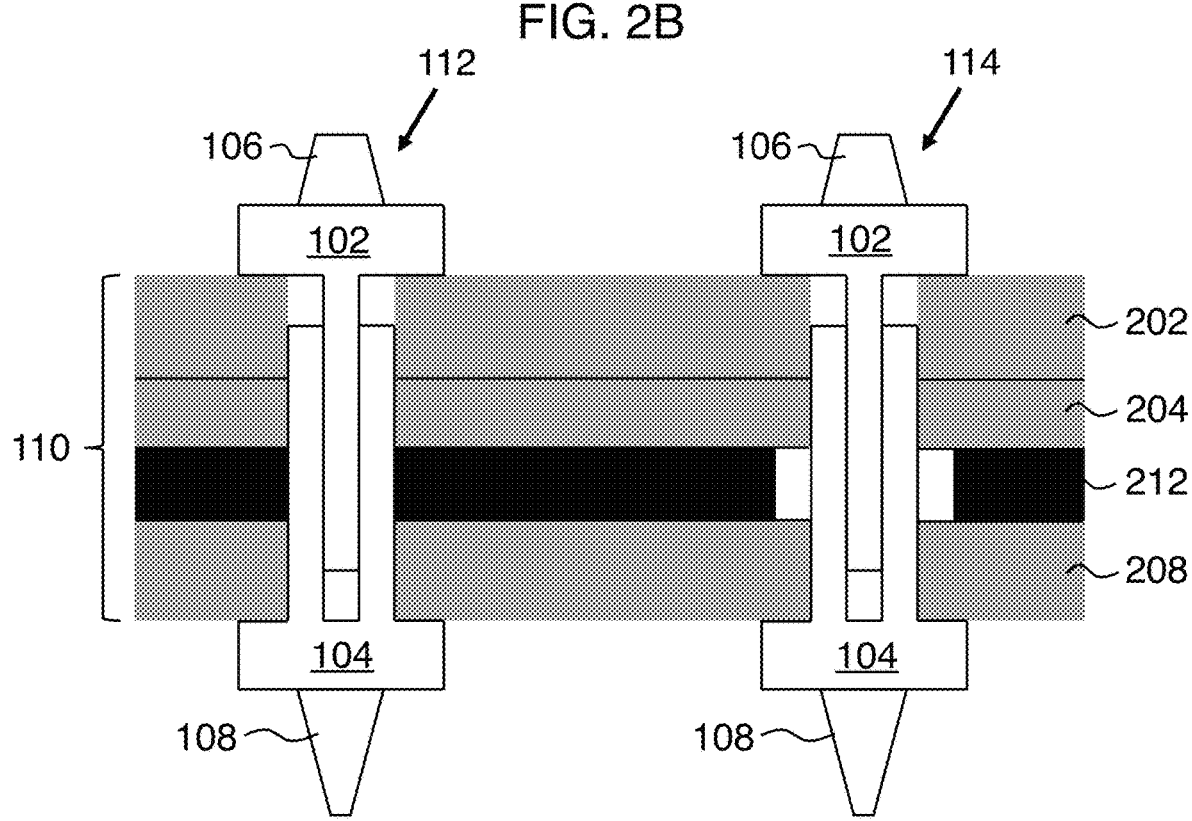

Various configurations of the elastic matrix 110 are possible. Suitable elastomer materials include, but are not limited to: silicones, urethanes, natural rubbers, and polymer gels. One option is a single elastomer sheet as shown in the example of FIG. 1. Another option is a multi-layer structure as shown on FIGS. 2A-C. In the example of FIG. 2A, elastic matrix 110 includes elastic layers 202, 204, 206, 208. Such multi-layer structures can improve probe location stability and/or improve management of the coefficient of thermal expansion. Non-elastic layers can be included in elastic matrix 110. FIG. 2B shows an example where elastic matrix 110 includes rigid guide plate 210 (which, for example, could be a ceramic). Such a guide plate can be used to improve probe location stability. FIG. 2C shows an example where elastic matrix 110 includes a metal layer 212. Such metal layers contact some but not all probes, as schematically shown on FIG. 2C by the contact between layer 212 and probe 112 and the gap between layer 212 and probe 114. Such metal layers can be used to electrically connect some or all probes of the same potential (e.g., ground probes or power supply probes). A composite elastomer (e.g., having embedded ceramic particles) can be used to provide control of the coefficient of thermal expansion.

Figure 3A:
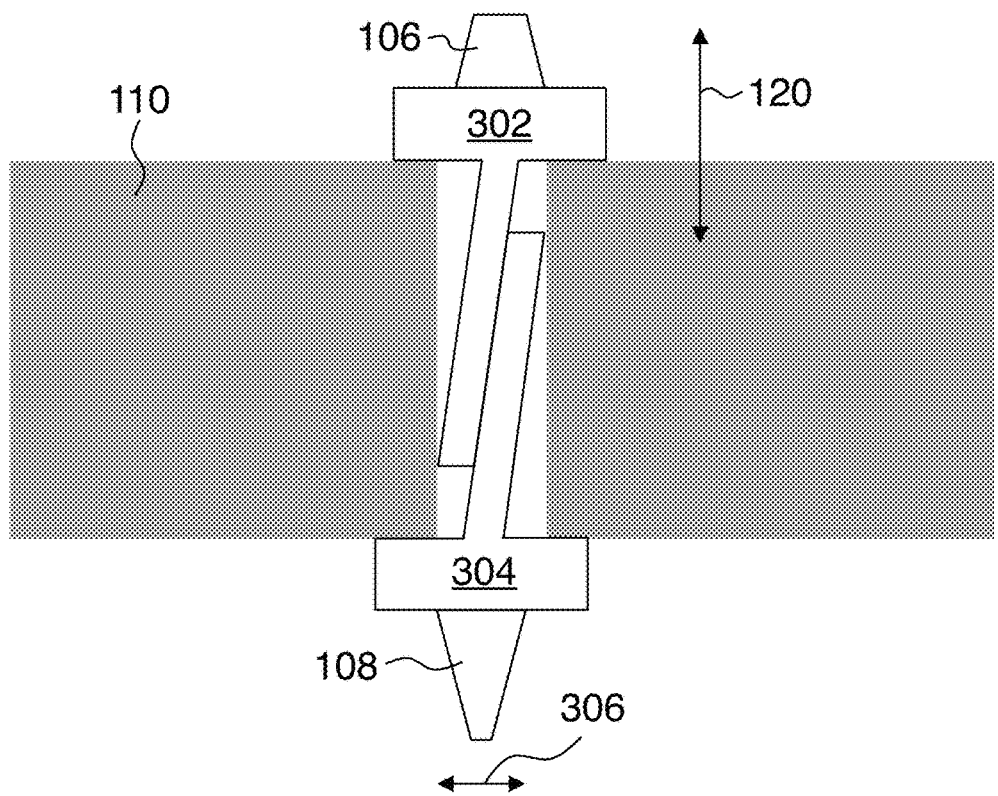
FIGS. 3A-C show exemplary embodiments of the invention having a scrub motion of probe tips.
Figure 3B:
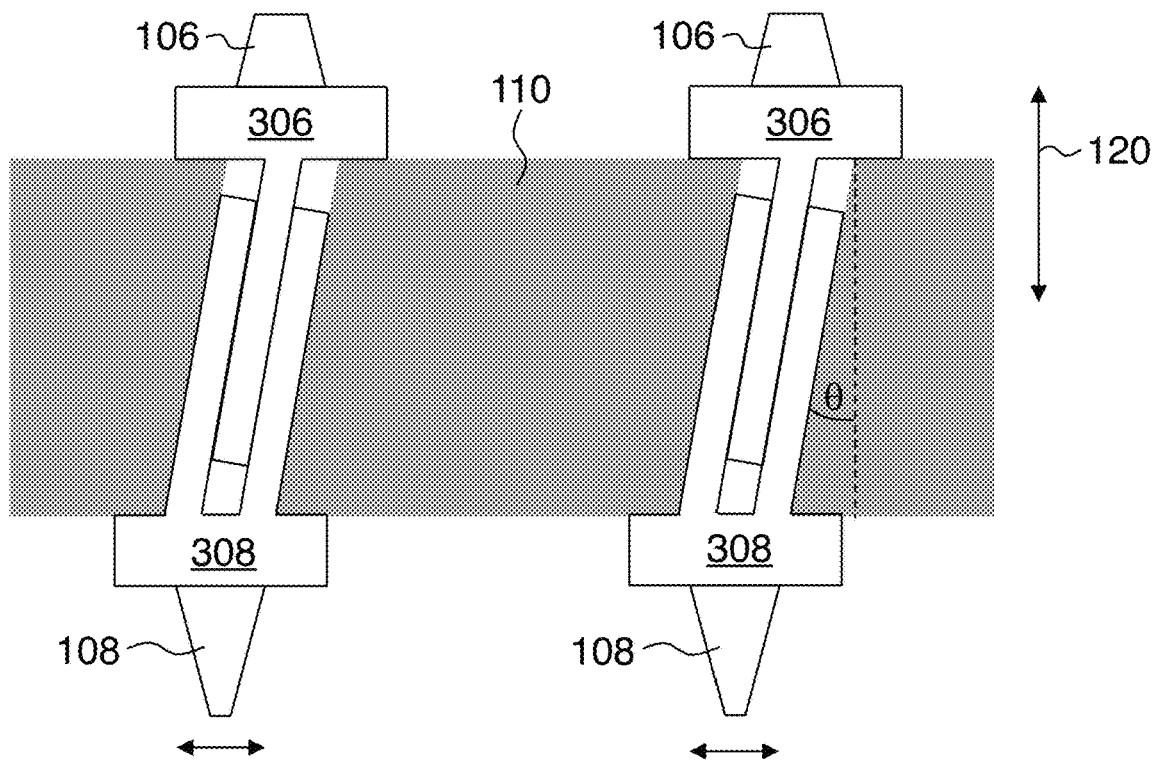
Figure 3C:
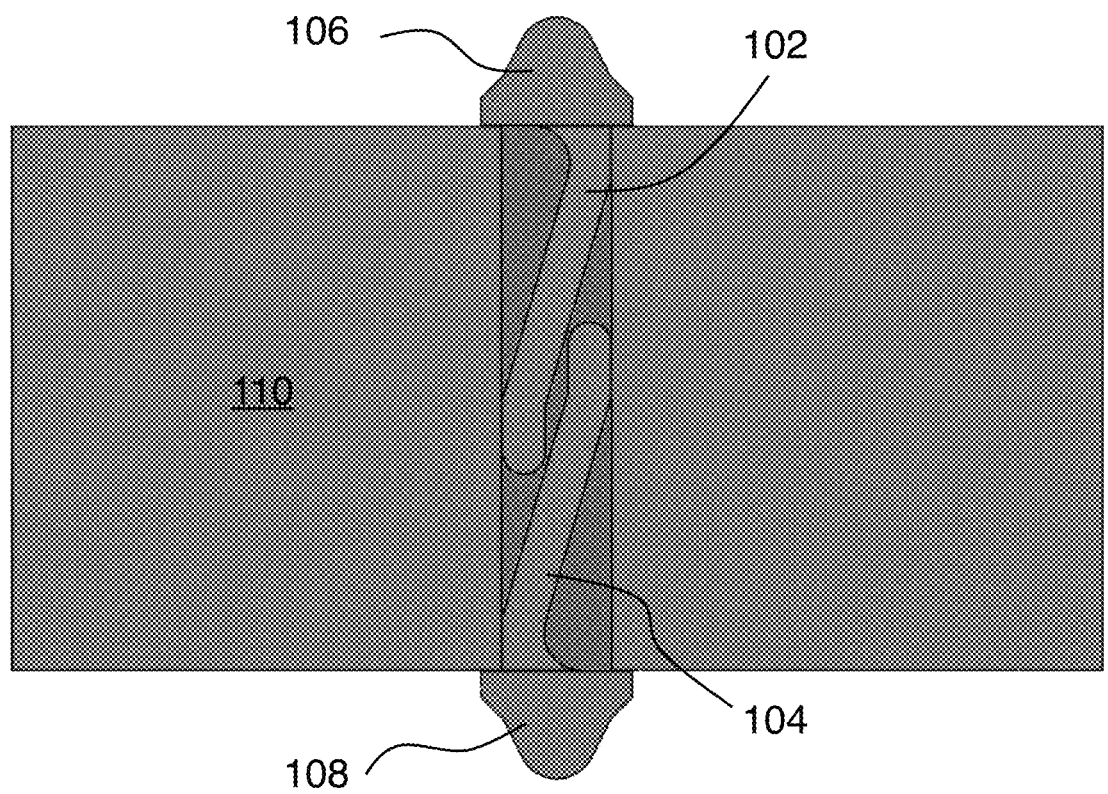

For vertical probes, it is often desirable for the device-side probe tip 108 to move laterally as the probe is compressed vertically. This is often referred to as a scrub motion of the probe tip. There are various ways to provide that capability in the present approach. One way is shown on FIG. 3A, where the probe is asymmetric such that a scrub motion 306 of probe tip 108 occurs as the asymmetric probe is vertically compressed (along direction 120). Another way to provide such scrub motion is shown on FIG. 3B. Here the through holes of elastic matrix 110 are disposed at an angle θ relative to the vertical direction 120 so that a scrub motion of probe tips 108 is provided as the probes are vertically compressed. Preferably, this angle θ is in a range from 5 to 15 degrees. In cases where no scrub motion is desired, symmetric probes in vertical probe holes (as in the example of FIG. 1) will have no scrub motion of the probe tips as the symmetric probes are vertically compressed. FIG. 3C shows another example of the asymmetric probe concept.

Figure 4:
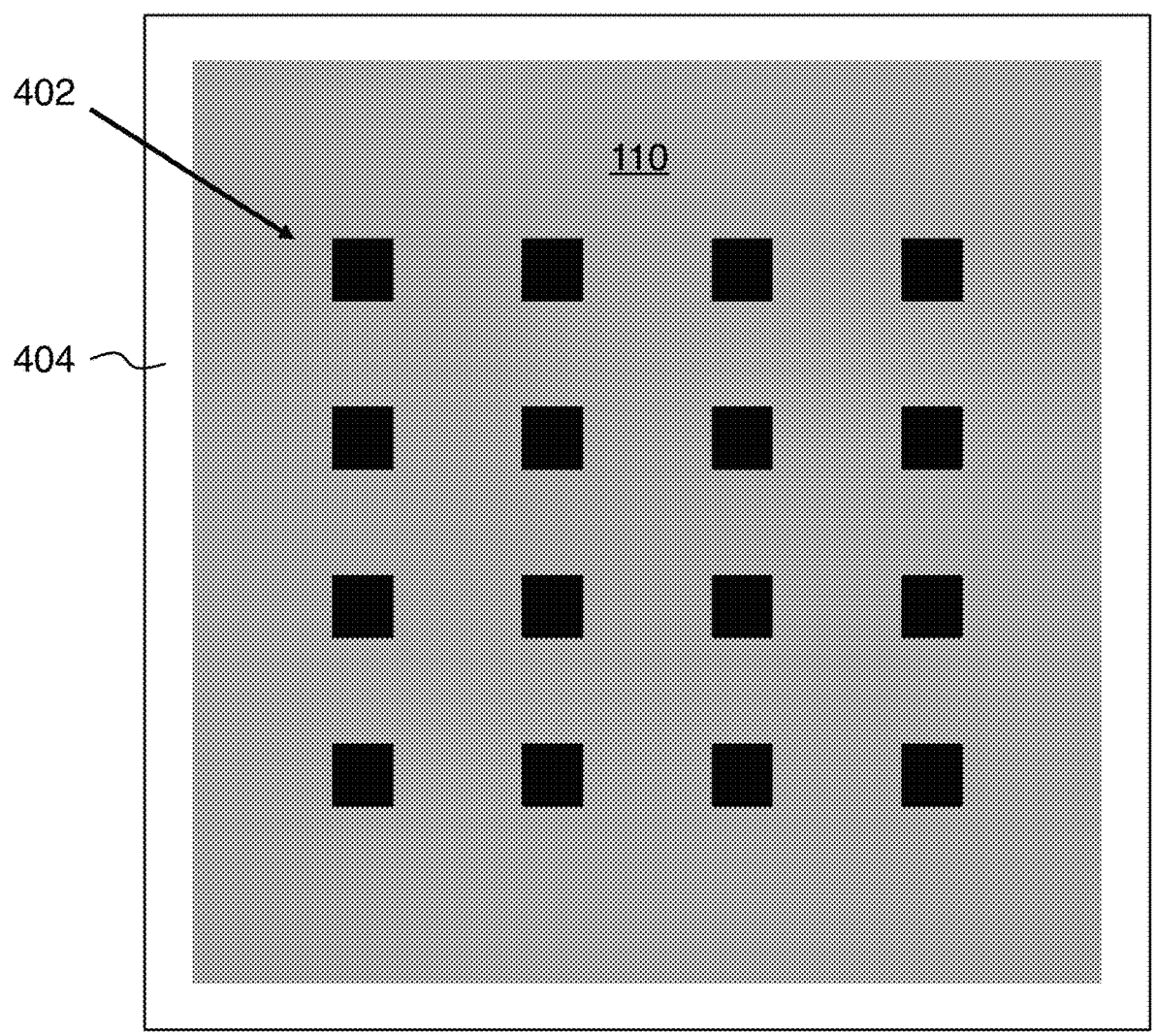
FIG. 4 shows an embodiment having a frame laterally surrounding the elastic matrix.

FIG. 4 is a top view of an exemplary embodiment that includes a rigid frame 404 configured to laterally surround elastic matrix 110. Here 402 is an exemplary 2D array of two-part probes as described above. Frame 404 is preferably made of a low coefficient of thermal expansion (CTE) material. Suitable frame materials include, but are not limited to: ceramics (such as silicon nitride, alumina, Photoveel™), controlled expansion metal alloys (such as Invar, Kovar and Alloy42), and rigid polymers or resins.

Figure 5:
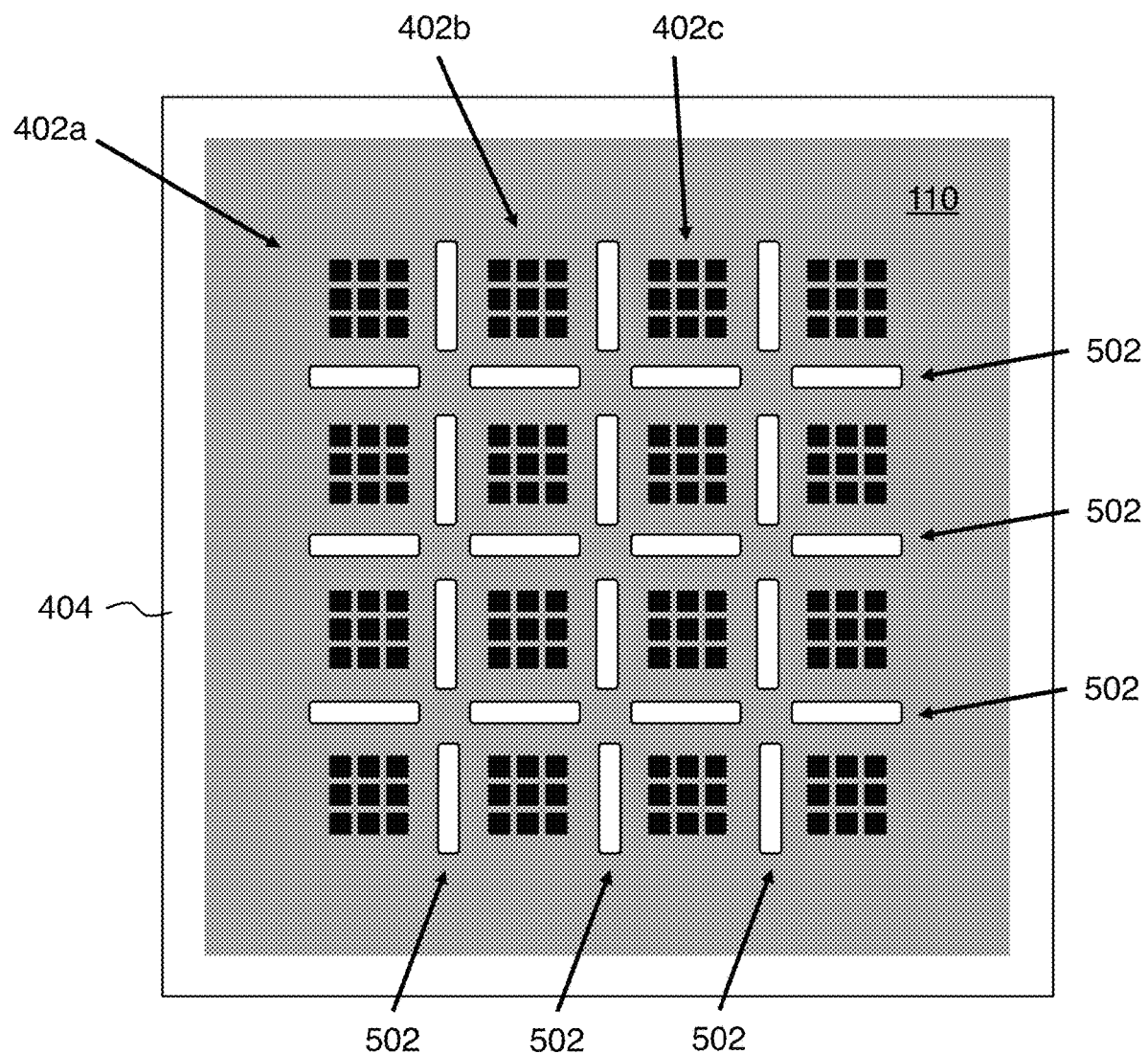
FIG. 5 shows an embodiment of the invention suitable for wafer-scale multi-die probing.

For wafer-scale testing, the probe array is often configured for multi-die probing, as in the example of FIG. 5. Here the probe array includes sub-arrays 402a, 402b, 402c, etc., where each subarray corresponds to one of the dies on the wafer being tested. In such cases, it is often preferred for elastic matrix 110 to include slots 502 disposed to align with die boundaries (as shown). Such slots improve mechanical isolation between the sub-arrays of probes.

Figure 6A:
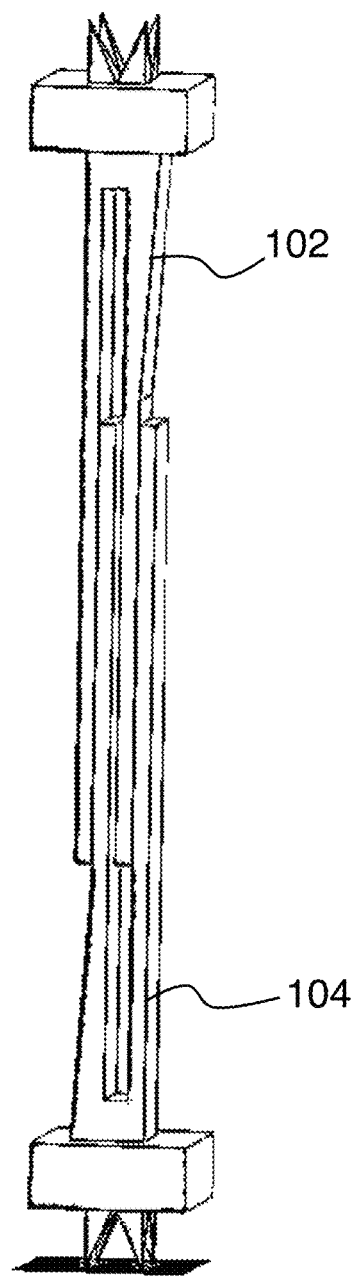
FIGS. 6A-B show exemplary multi-prong probes.
Figure 6B:
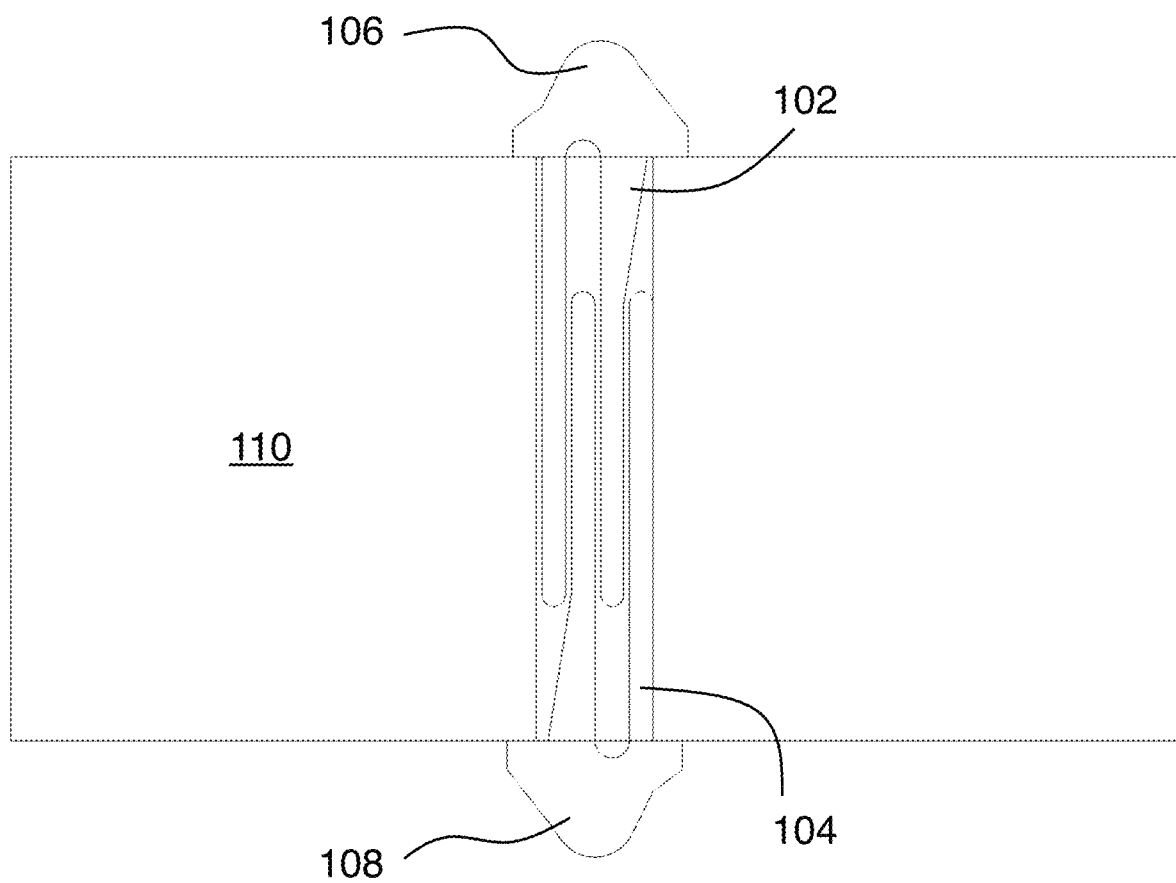

The two or more probes can include at least one multi-prong probe where a contact force between probe parts increases as the multi-prong probe is vertically compressed. FIG. 6A shows an example of a multi-prong probe having this property. Typically, such probes include at least one wedge feature that slides into an elastic slot as the probe is vertically compressed, thereby increasing contact force between the two parts of the probe. FIG. 6B shows another example of such a multi-prong probe.

Figure 7C:
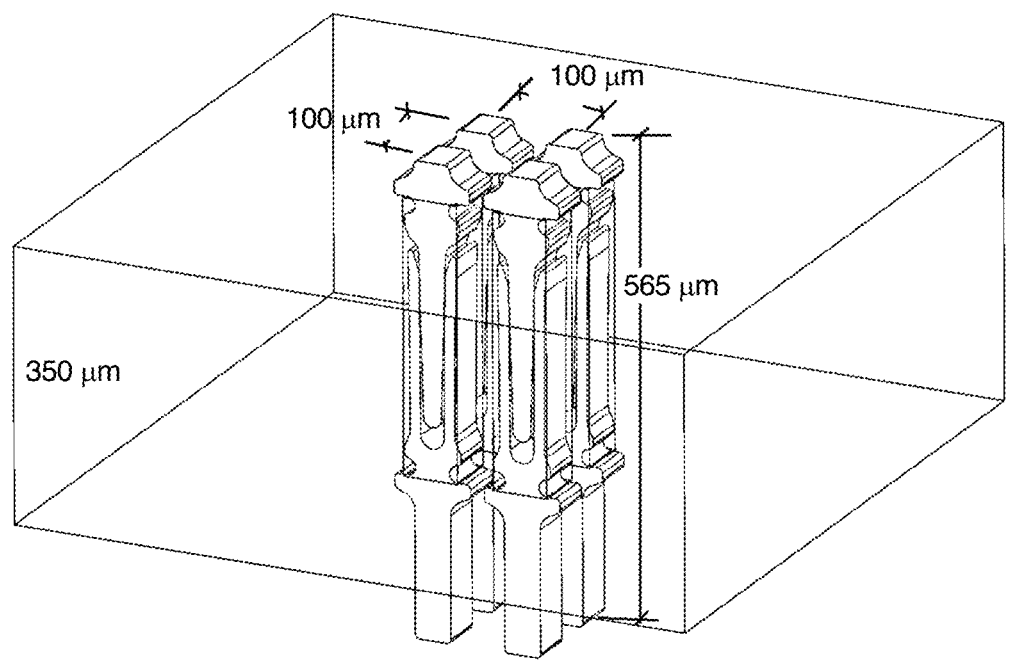
Figure 7D:
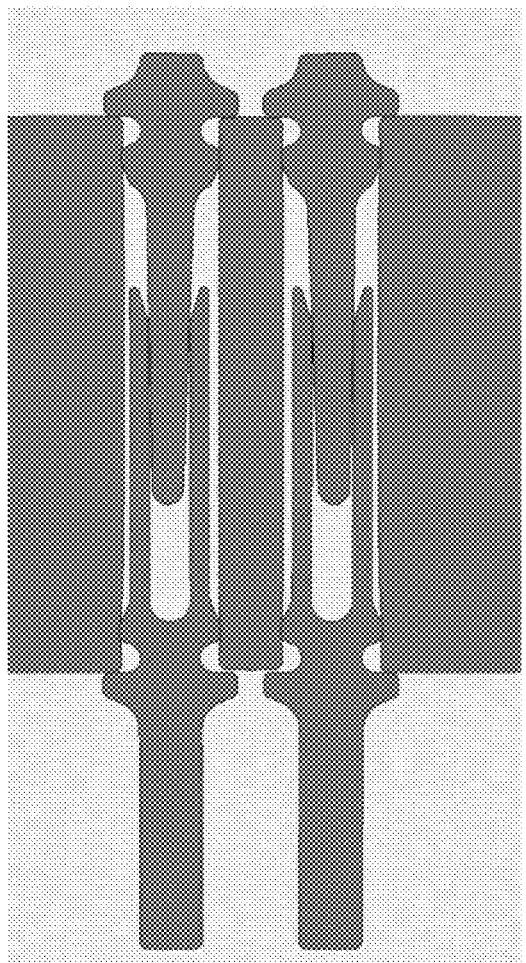
Figure 7E:
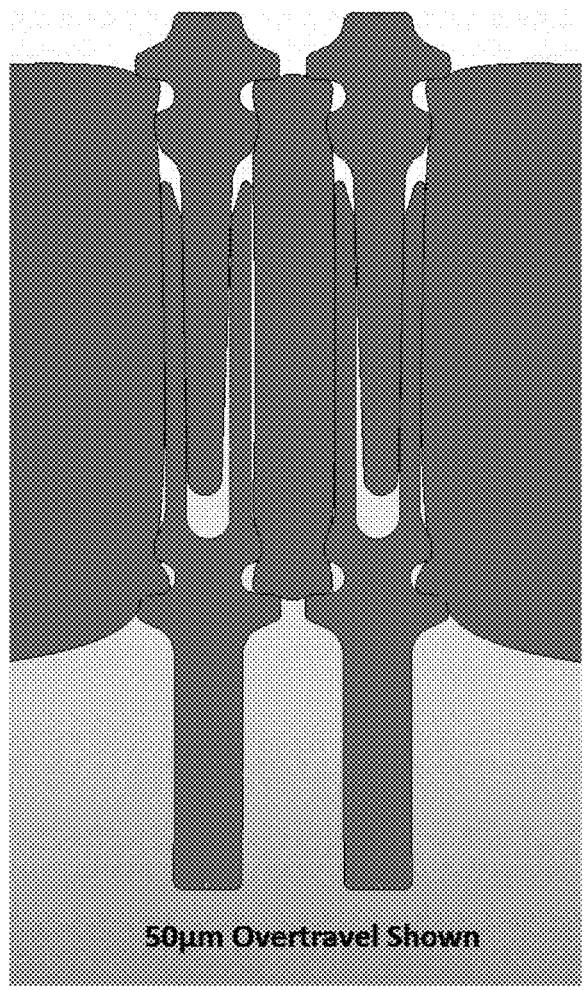

FIGS. 7A-E show an exemplary probe design where FIG. 7A shows the probes in the elastic matrix, and FIG. 7B is an isometric view of a single probe. FIG. 7C is an isometric view of the probes in the elastic matrix, showing a probe pitch of 100 μm. FIG. 7D shows a view of the probe in an uncompressed state, and FIG. 7E is a corresponding view with vertical compression (50 μm overtravel). Here overtravel is the distance through which a vertical probe is compressed.

Figure 8A:
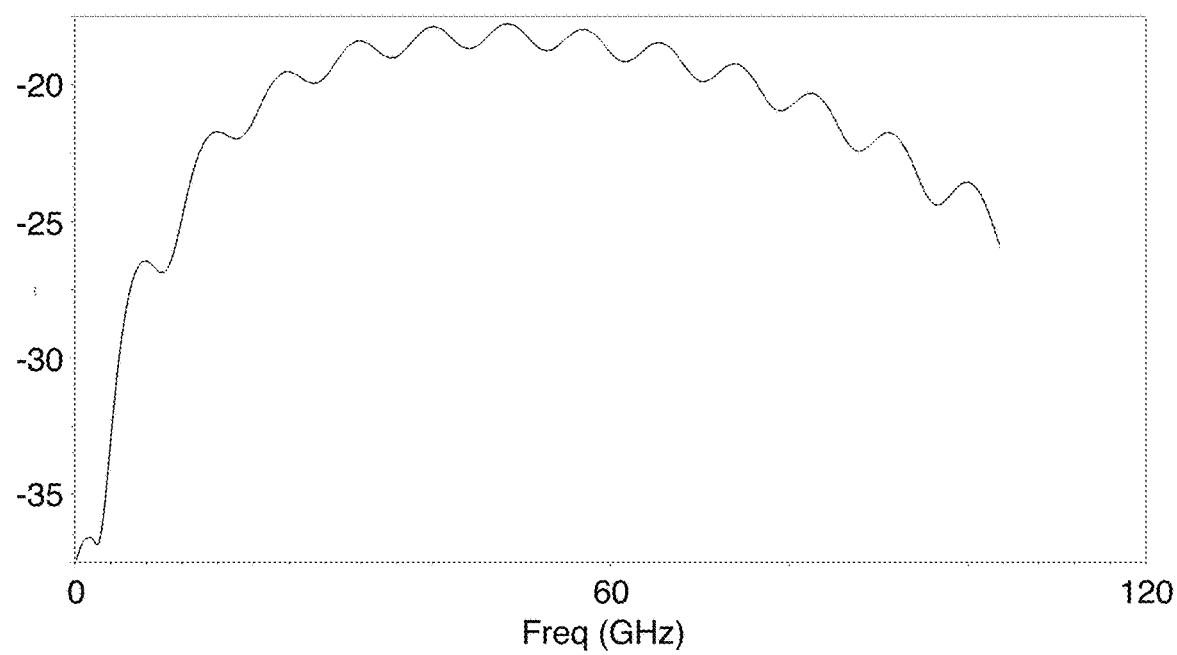
FIGS. 8A-C show modeled electrical performance of the example of FIGS. 7A-E.
Figure 8B:
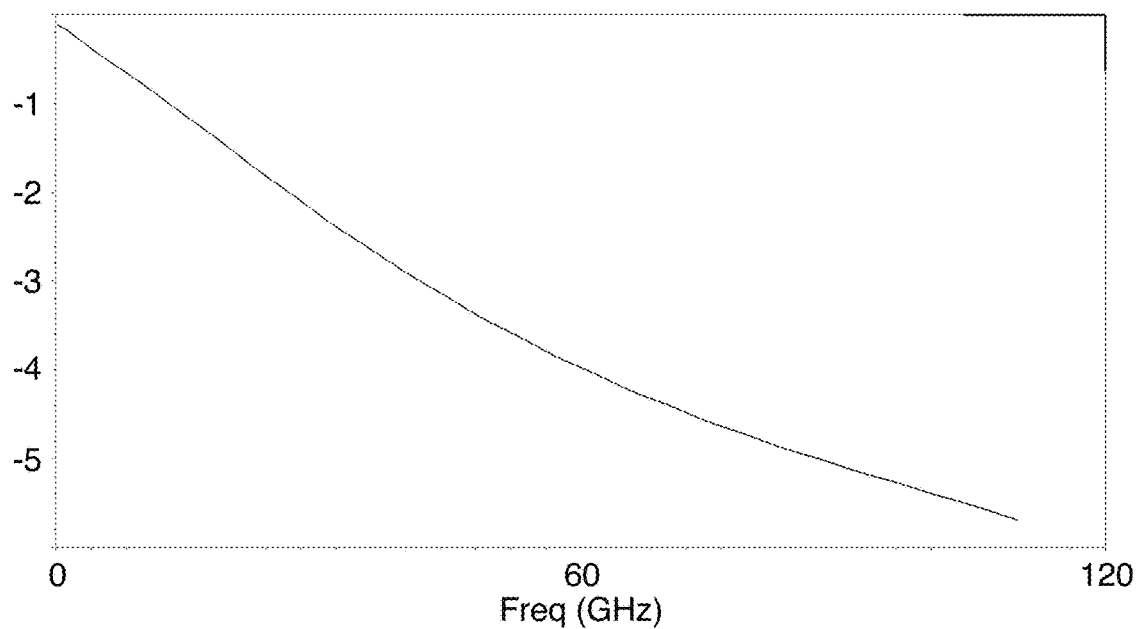
Figure 8C:
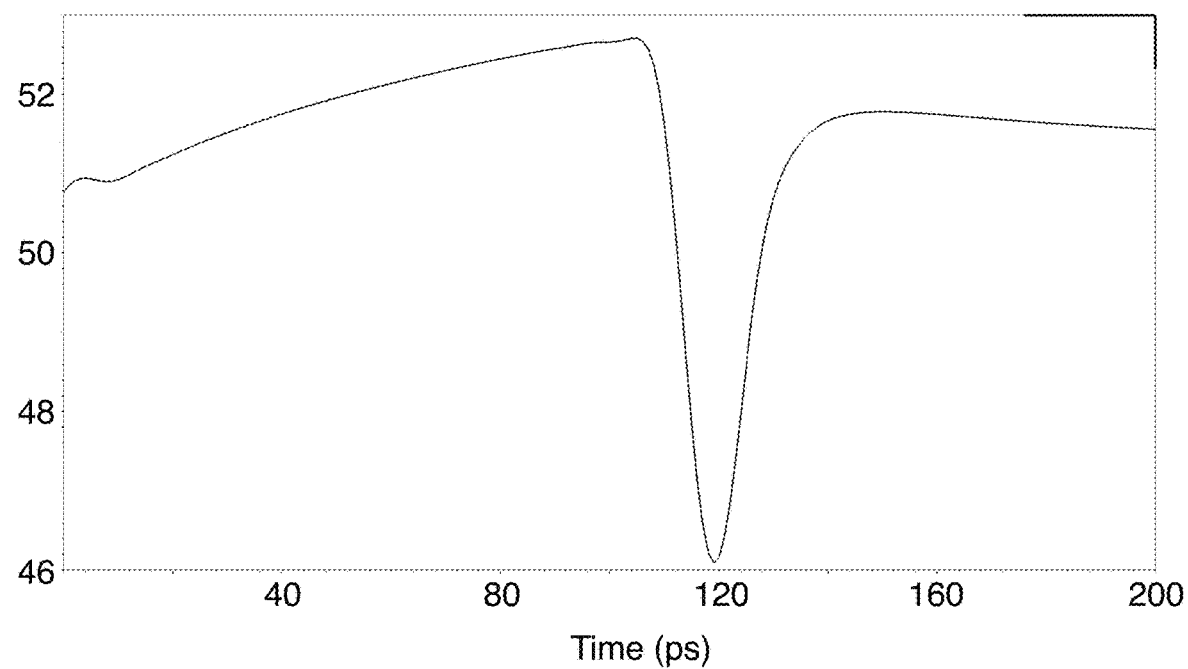

FIGS. 8A-C show excellent electrical performance of the design of FIGS. 7A-E. The modeled bandwidth exceeds 100 GHz (-15 dB) due to the exceptionally short probe length of about 500 μm. Here FIG. 8A shows S11, FIG. 8B shows S21, and FIG. 8C shows modeled time-domain reflectometry results for the probe of this example.

Figure 9A:
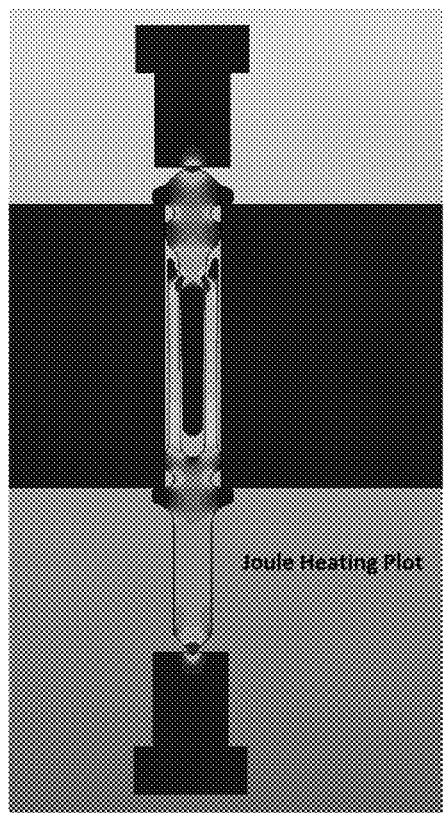
FIGS. 9A-B show modeled thermal performance of the example of FIGS. 7A-E.
Figure 9B:
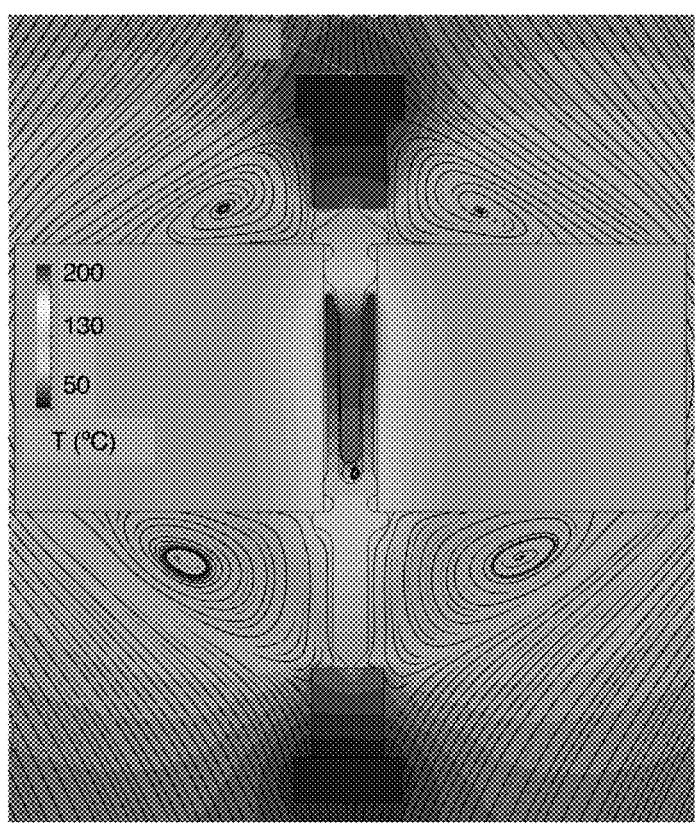

FIGS. 9A-B show modeling results for current carrying capacity (CCC) of this design. The estimated CCC from this modeling is 1.5 A, based on modeled temperature rise in the elastomer and its thermal damage threshold. Here the image of FIG. 9A shows modeled Joule heating in the probe, and the image of FIG. 9B shows modeled temperature of the probe in the elastic matrix as a result of this Joule heating.

The invention claimed is:

1. A probe array for making temporary electrical contact to a device under test, the probe array comprising:
   two or more probes; and
   an elastic matrix configured as a sheet having at least one elastomer layer and including an array of through holes, wherein each of the two or more probes is disposed in a corresponding one of the through holes, and wherein a vertical direction is perpendicular to the elastic matrix;
   wherein each probe of the two or more probes includes a first part and a second part configured to make a sliding electrical contact with each other as the first part and the second part move with respect to each other along the vertical direction;
   wherein each probe of the two or more probes engages with the elastic matrix such that a restoring force in response to vertical probe compression is provided by the elastic matrix;
   wherein a tip to tip length of the two or more probes is between 250 μm and 750 μm, and wherein an electrical bandwidth of the two or more probes is at least 100 GHz.

2. The probe array of claim 1, wherein the elastic matrix includes embedded ceramic particles.

3. The probe array of claim 1, wherein the elastic matrix includes a multi-layer structure.

4. The probe array of claim 3, wherein one or more layers of the multi-layer structure are metal layers configured to electrically connect some of the two or more probes to each other.

5. The probe array of claim 3, wherein the multi-layer structure includes a ceramic plate configured to define lateral probe positions.

6. The probe array of claim 1, wherein the two or more probes include at least one symmetric probe having no scrub motion of a probe tip as the symmetric probe is vertically compressed.

7. The probe array of claim 1, wherein the two or more probes include at least one asymmetric probe having a scrub motion of a probe tip as the asymmetric probe is vertically compressed.

8. The probe array of claim 1, wherein the two or more probes include at least one multi-prong probe where a contact force between probe parts increases as the multi-prong probe is vertically compressed.

9. The probe array of claim 1, wherein at least one of the two or more probes is adhesively affixed to the through hole of the elastic matrix that it corresponds to.

10. The probe array of claim 1, further comprising a rigid frame configured to laterally surround the elastic matrix.

11. The probe array of claim 1, wherein the probe array is configured for multi-die probing, and wherein the elastic matrix includes one or more slots disposed to align with die boundaries.

12. The probe array of claim 1, wherein the through holes of the elastic matrix are disposed at an angle relative to the vertical direction, whereby a scrub motion of probe tips is provided as the probes are vertically compressed.

13. The probe array of claim 12, wherein the angle is in a range from 5 to 15 degrees.

\* \* \* \* \*